United States Patent
Birnbaum

(10) Patent No.: US 12,532,061 B2
(45) Date of Patent: Jan. 20, 2026

(54) HIGH VOLTAGE DISCHARGE ELECTRODE FOR ELECTROSTATIC CHARGE NEUTRALIZATION IN COMPACT CAMERA MODULES

(71) Applicant: Apple Inc., Cupertino, CA (US)

(72) Inventor: Zachary W. Birnbaum, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 189 days.

(21) Appl. No.: 18/227,496

(22) Filed: Jul. 28, 2023

(65) Prior Publication Data

US 2025/0039530 A1 Jan. 30, 2025

(51) Int. Cl.
*H04N 5/335* (2011.01)
*H04N 23/51* (2023.01)
*H04N 23/55* (2023.01)
*H04N 23/57* (2023.01)

(52) U.S. Cl.
CPC .............. *H04N 23/57* (2023.01); *H04N 23/51* (2023.01); *H04N 23/55* (2023.01)

(58) Field of Classification Search
CPC ........................................... H04N 23/57
See application file for complete search history.

(56) References Cited

U.S. PATENT DOCUMENTS

| | | | |
|---|---|---|---|
| 6,543,078 B1 * | 4/2003 | Ernst ...................... | B08B 5/04 |
| | | | 15/309.2 |
| 8,681,231 B2 * | 3/2014 | Asakura ............. | H04N 23/6812 |
| | | | 348/208.99 |
| 2001/0055072 A1 * | 12/2001 | Mogamiya ............. | H04N 23/52 |
| | | | 396/479 |
| 2007/0212058 A1 | 9/2007 | Kawai | |
| 2008/0274580 A1 | 11/2008 | Jung | |
| 2009/0309982 A1 * | 12/2009 | Rouvinen .......... | H04N 23/6812 |
| | | | 348/E5.046 |

FOREIGN PATENT DOCUMENTS

| | | | | |
|---|---|---|---|---|
| CN | 111935385 B | * | 11/2024 | ............. H04N 23/52 |
| EP | 2858755 | | 9/2017 | |
| EP | 3489091 | | 9/2021 | |
| JP | 2000029132 A | * | 1/2000 | |
| JP | 2010072278 A | * | 4/2010 | |

OTHER PUBLICATIONS

U.S. Appl. No. 18/240,648, filed Aug. 31, 2023, Birnbaum et al.

* cited by examiner

Primary Examiner — Gary C Vieaux
(74) Attorney, Agent, or Firm — Brownstein Hyatt Farber Schreck, LLP

(57) ABSTRACT

A camera module for an electronic device includes an actuator structure for positioning an element of the camera module, such as an image sensor or a lens element. The actuator structure includes an insulating material that physically and conductively separates the image sensor from a discharge electrode configured to be driven to high voltage so as to ionize gasses within a module housing of the camera module without risking arcing to the image sensor. Operation of the discharge electrode may neutralize charged surfaces and/or charged particles in the camera module, which may facilitate operation of the camera module.

17 Claims, 9 Drawing Sheets

HIGH VOLTAGE DISCHARGE ELECTRODE FOR ELECTROSTATIC CHARGE NEUTRALIZATION IN COMPACT CAMERA MODULES

FIELD

Embodiments described herein relate to camera modules for portable electronic devices and, in particular, to high voltage discharge electrodes for ionizing gasses within camera module enclosures so as to neutralize accumulated charge.

BACKGROUND

A portable electronic device may include a compact camera module for capturing an image. A conventional compact camera module includes an image sensor aligned with a focal plane defined by a lens group. In many cases, one or more lenses of the lens group and/or the image sensor itself may be movable to adjust focus and/or for optical image stabilization.

Over time, however, repeated relative motion of conductors and insulators within the compact camera module cause electrostatic charge accumulation. These electrostatic charges lead to attractive forces that interfere with optical image stabilization movements and degrade focus and imaging performance.

SUMMARY

Embodiments described herein take the form of a compact camera module including at least a module housing enclosing an interior volume. The module housing can be defined by an upper housing part and a lower housing part.

The compact camera module includes a substrate within the module housing and defining an upper surface and defining, with the upper housing part a first portion of the interior volume. In addition, the substrate defines a lower surface facing the lower housing part and defining with the lower housing part a second portion of the interior volume.

The module also includes an infrared cut filter disposed on the upper surface within the first portion of the interior volume and an image sensor disposed on the lower surface within the second portion of the interior volume.

The module further includes a discharge electrode disposed on the upper surface and configured to ionize gases within the first portion of the interior volume to neutralize charge accumulation within the interior volume. As a result of this construction, the discharge electrode is physically separated from the image sensor by the infrared cut filter and the substrate, thereby preventing arcing.

Some embodiments described herein take the form of a camera module including a module housing enclosing an interior volume, a substrate within the module housing and defining an aperture. In such embodiments, a high voltage electrode can be disposed the substrate and configured to ionize gases within the interior volume so as to neutralize charge accumulated on a surface within the interior volume. The camera module can also include an image sensor disposed on the substrate, aligned with the aperture, and separated from the high voltage electrode by the substrate thereby preventing arcing between the high voltage electrode and the image sensor.

Some embodiments described herein take the form of a method of signaling actuation of a discharge electrode disposed within a compact camera module opposite an insulating substrate from an image sensor of the discharge electrode. Specifically, the method can include the operations of: performing at least one of (1) a first detection operation including receiving an image captured by the image sensor and determining that the image includes a low contrast blemish, or (2) a second detection operation with determining that the camera module failed a dynamic stability test; and in accordance with a determination that the image includes the high contrast blemish or that the camera module failed the dynamic stability test, generating a signal to cause a high voltage circuit within the compact camera module to apply a high voltage signal to the discharge electrode so as to neutralize charge accumulated on a surface within the interior volume.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
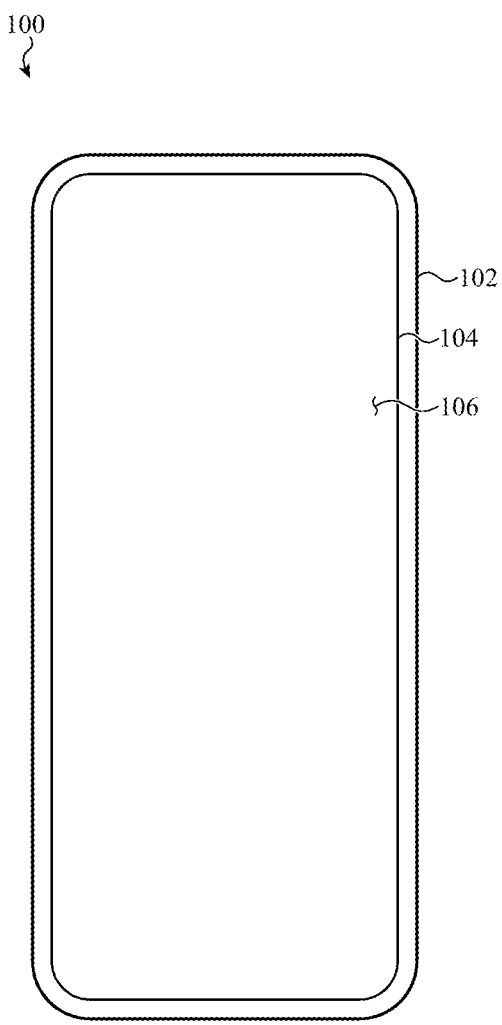
FIG. 1A depicts an example electronic device that can include a camera system and/or camera module, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems for managing electrostatic charge accumulation in compact camera modules configured for electronic devices.

As used herein, the term "compact camera module" and similar phrases refer generally to camera modules suitable for electronic devices, which may be portable electronic device. In many cases, although not required, a portable electronic device incorporating a camera module or compact camera module as described herein can be a low-profile electronic device or a small form-factor electronic device. Generally and broadly, a compact camera module can occupy a volume on an order of three cubic centimeters or less although a person of skill in the art may readily appreciate that this is neither an upper nor lower limit and that compact camera modules can take many forms.

A camera module as described herein can include one or more movable parts. For example, a compact camera module can include an optical image stabilization system and/or an autofocus system each configured to move a lens or an image sensor.

For example, a camera module as described herein can include one or more coils to physically move one or more movable elements of that camera module. Principles of operation may vary from embodiment to embodiment, but in many cases and constructions, a coil may be used to leverage Lorenz force to physically move the coil itself (relative to a magnetic field of a permanent magnet) or another body mechanically coupled to a movable element. In some cases, an image sensor of a camera module may be movable (e.g., translatable in plane, movable in a Z axis, tiltable, and so on). In other cases, one or more lenses of a lens group positioned over an image sensor may be movable. In some constructions, both lenses and an image sensor may be movable.

A camera module can include multiple coils for physically moving or relocating multiple movable elements of that camera module, but for simplicity of description and illustration, single coils are described herein. In other cases, other actuators may be used to move elements or components within a camera module. In some cases, multiple actuators of different actuation types or modalities may be used.

In many embodiments, a camera module takes a small form factor so as to be incorporable into a portable electronic device. For simplicity of description, implementations in which a camera module is constructed to be incorporated into a portable electronic device are described herein, although it may be appreciated that this is merely one example, and that coils as described herein (and more broadly camera modules as described herein) can take any suitable form factor.

Independent of form factor or actuation type, a camera module as described herein is understood to have at least two surfaces that move relative to one another. In many embodiments, at least one of the surface may be an insulating material, such as glass, plastic or acrylic. As known to a person of skill in the art, motion of electrical insulators relative to other materials can cause accumulation of electrical charge.

Accumulated electrical charge within a compact camera module can be associated with performance degradations. For example, a charged surface can attract and retain dust particles. In some cases, a charged surface may be within an optical path of the camera module. For example, the charged surface may be an optical element such as lens or a filter that is transparent to, or substantially transparent to visible light. In other examples, a particle can be charged. Examples include an infrared cut filter or a color filter. In these cases, the charged optical element (and/or charged particles) can attract and collect particles that, due to the small mass and volume of such particles, may not be easily or readily dislodged. Specifically, due to the small mass of the particles, inertia sufficient to dislodge the particles may not be easily achieved by mechanical agitation. In many cases, these dust particles may cast a shadow against an image sensor introducing an imaging defect referred to as a "low contrast blemish." More simply, accumulated dust particles can result in grey spots and other undesirable effects.

In many case, dust particles can be captured within a compact camera module during manufacturing. In these examples, when a camera module undergoes production testing to verify that movable elements move within specification, charge can accumulate and attract and retain dust resulting from prior manufacturing steps or the test environment itself. Thereafter, during image testing, low contrast blemishes may be detected and the module maybe rejected or diverted for further cleaning or testing. In either case, presence of dust and accumulated charge increases manufacturing cost and rejection rates and/or reduces manufacturing efficiency.

In other cases, accumulated charge can present an attractive force between charged surfaces and other adjacent surfaces. These attractive forces can interfere with operation of optical image stabilization systems and/or autofocus systems. As charge accumulation increases, the actuation systems associated with optical image stabilization or autofocus may be required to exert a force that opposes the attractive force or exert a force aligned with the attractive force. In both circumstances, resulting motion in movable elements may be unexpected—either to little motion (motion opposes force) or too much motion (motion aligns with force). In these cases, the camera module may operate unexpectedly, from a user perspective. For example, autofocus performance may degrade or slow, and optical image stabilization performance may degrade. In an extreme example, accumulated charge may impart so much attractive force so as to render optical image stabilization functionality completely inoperative.

To account for these and other performance degradations associated with accumulated charge, embodiments described herein include within the camera module a high voltage subsystem and a discharge electrode conductively coupled to an output of the high voltage subsystem. The voltage can induce corona discharge from a tip of the discharge electrode so as to ionize surrounding gases (typically air). Positive voltage to induce positive corona discharge may be selected in some embodiments, whereas in other cases, negative voltage may be selected to induce negative corona discharge. In several embodiments, alternating polarity may be used. In many cases, positive corona discharge may be selected so as to minimize production of ozone, which may oxidize components within the camera module and/or an electronic device incorporating it.

The high voltage subsystem can be configured to operate through a wide range of voltages, but as may be appreciated by a person of skill in the art kilovolt ranges may be required to induce ionization. In some examples, 8-14 kV may be produced by the high voltage system. In other cases, other voltages may be appropriate. In some embodiments, output from a temperature sensor or humidity sensor or barometric pressure sensor can be used to inform a voltage level selected to induce ionization. In many embodiments, the discharge electrode may be at least partially shrouded or disposed within an insulating housing part so as to minimize risk of arcing to other components within the camera module, such as the imaging sensor.

In these examples, once the discharge electrode is driven to a suitable voltage for a suitable time period (and/or at a suitable duty cycle), ions may disperse within the housing of the camera module, neutralizing charged surfaces. Once a charged surface is brought to neutral charge by operation of the discharge electrode, dust particles previously attracted to that surface may be dislodged (by ultrasonic agitation, by movement of a movable lens part, by field use of the electronic device, and so on). Once dislodged, the dust particles may be trapped and secured by an adhesive strip within the camera module housing. In other cases, a second electrode can be disposed within the camera module that is oppositely charged to the discharge electrode. In these embodiments, a dust particular may be repelled by one electrode and attracted to the other, in either case motivated away from imaging optics of the camera module.

In addition to clearing dust particles from the camera module, charge neutralization by ionization as described herein can return nominal operating conditions for optical image stabilization systems and autofocus systems.

Further embodiments described herein relate to methods for triggering an ionization operation as described above. In some cases, a camera module can operate a discharge electrode when an electronic device is idle. In other case, a camera module as describes herein can operate a discharge electrode on a fixed or variable schedule. In other cases, the camera module as described herein can operate a discharge electrode upon startup or in response to a user indication. A camera module as described herein can be operated in response to a signal resulting from an image quality analysis configured to detect low contrast blemishes.

These foregoing and other embodiments are discussed below with reference to FIGS. 1A-7. However, those skilled in the art will readily appreciate that the detailed description given herein with respect to these figures is for explanation only and should not be construed as limiting.

FIG. 1A depicts an example electronic device that can include a camera system and/or camera module, such as described herein. The electronic device 100 may be a portable electronic device, such as a cellular phone, wearable device, laptop, desktop computer, or tablet computing device. It may be appreciated, however, that a portable electronic device is merely one example device that can include a camera system and/or camera module as described herein. In some cases, the camera module may be incorporated into larger electronic device such as vehicles (e.g., for security cameras, driver assist, or automated driving purposes), medical or surgical equipment, motion capture devices, and so on.

The electronic device 100 as depicted in FIG. 1A is defined at least in part by a low-profile housing, identified in the figure as the housing 102. The housing 102 can enclose and support one or more components of the electronic device 100, such as a processor, one or more memory components or circuits, a battery, and a display 104.

For simplicity of description and illustration, FIG. 1A is depicted without many of these components; a person of skill in the art may readily appreciate that a number of components, circuits, structures, and systems can be included in the housing 102 of the electronic device 100. For example, the electronic device 100 can include a processor configured to access a memory to instantiate a software application configured to render a graphical user interface 106 via the display 104.

Figure 1B:
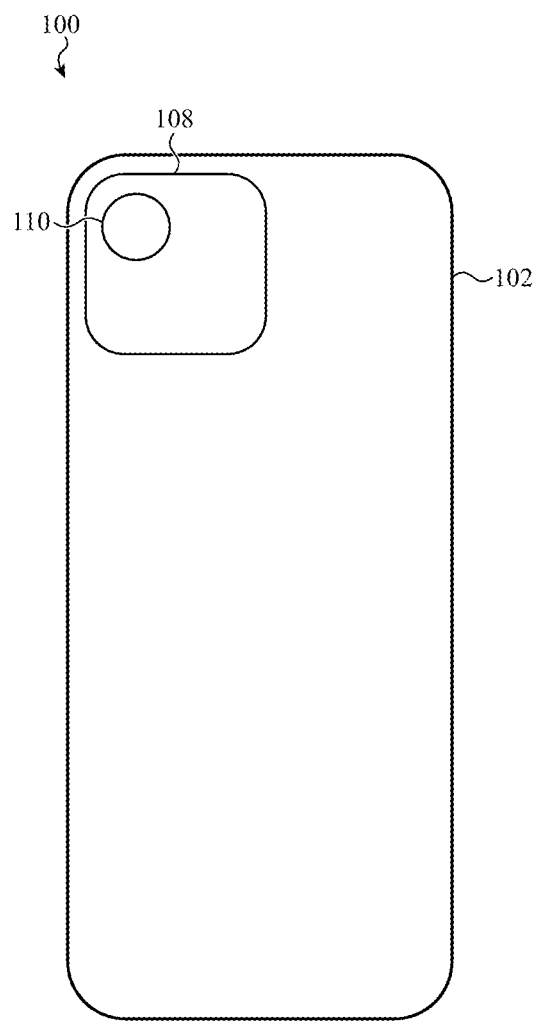
FIG. 1B depicts the example electronic device of FIG. 1A, showing a camera module, such as described herein.

The software application can, in some examples, be configured to integrate with one or more hardware sensors or sensing systems of the electronic device 100, such as a camera module. FIG. 1B depicts the example electronic device of FIG. 1A, showing an imaging system 108. The imaging system 108 can include a protective lens, behind which a camera module 110 can be positioned.

In particular, the a camera module 110 can include an image sensor disposed at an image plane defined by a lens group of the camera module 110. The lens group(s) may define a fixed or variable focal length for the image sensor. For simplicity of description, a single image sensor and lens group are described with reference to the embodiments that follow; it is appreciated that in many cases, the imaging system can include multiple lens groups, multiple image sensor, and so on.

As noted above, a lens group and/or an image sensor may be movable. In many cases, the movable element(s) can include an image sensor and/or one or more lenses of a lens group. For example, an image sensor can be operably coupled to an actuator structure configured to translate the image sensor by a distance in a direction in plane with, or at an angle with respect to, an active imaging area of the image sensor.

In other cases, the actuator structure can be configured to translate the image sensor, in plane, by a first distance in a first direction (e.g., along an X axis), and by a second distance in a second direction (e.g., along a Y axis). In yet other examples, the actuator structure can be configured to translate the image sensor in three directions, for example, X Y and Z axes (e.g., translating out of X-Y plane).

In other cases, the actuator structure can be configured to pivot about one or more fulcrums so as to change one or more angles describing a relative position between a normal vector of the imaging plane (e.g., in plane with an active imaging area of the image sensor) and a central axis of one or more lenses above the image sensor. For example, the image sensor may be configured, by the actuator structure, to tilt or otherwise rotate relative to a central axis of a lens group. More simply, in some cases lenses can pivot or rotate relative to a normal vector in respect of a positionally-fixed image sensor, in other cases an image sensor can pivot or rotate relative to a normal vector in respect of a positionally-fixed lens group, in yet other cases, both an image sensor and lens groups can move relative to a module housing.

As may be appreciated by a person of skill in the art, a movable image sensor may be useful for optical image stabilization purposes. In other cases, movement of an image sensor may be intentionally induced so as to impart a unique imaging effect, such as tilt-shift photographic techniques.

In other cases, one or more lenses may be additionally or alternatively movable by a separate actuator structure to the actuator structure described above. A movable lens may be configurable to pivot, translate in plane, translate out of plane, rotate, and so on.

An actuator structure as described herein typically includes at least one coil that leverages Lorenz force to physically move itself relative to a permanent magnet or, in some constructions, to move a magnet relative to itself. In other cases, leveraging the Lorenz force may not be required of a particular design or implementation; a coil may be used as a solenoid to attract or repel a ferromagnetic or diamagnetic material. In many cases, an actuator structure can include multiple coils. For example, three coils may be used to control three degrees of freedom of a movable image sensor.

An "actuator structure," as referenced herein, can be operably and/or conductively coupled to an actuator controller which may be implemented as an application specific integrated circuit within a camera module, such as the imaging system 108. In some embodiments, the actuator controller may be operably coupled to an instance of firmware instantiated by cooperation of a processor and memory of the imaging system 108.

The actuator controller may receive instructions and/or signals from the instance of firmware and/or from the processor directly, to apply a voltage or current to one or more coils in order to change a physical position of a movable element of the imaging system 108 (such as a lens or the image sensor).

For example, in some cases, a particular magnitude of current may be circulated through a specified coil that is, itself, within a magnetic field originating from a permanent magnet nearby in order to induce a Lorenz force of known magnitude to cause the coil (and elements physically coupled to the coil) to move in a particular direction. More simply, the actuator controller may receive one or more instructions to move a movable element in a particular direction for a particular distance and/or to a particular angle. The instruction can correspond to a particular actuation current that, after calibration (either during manufacturing or in the field), is associated with a particular movement. More specifically, particular current or particular voltage can be presumed by the imaging system 108 to move a particular moveable element to a specific location, in a particular amount of time.

In some cases, the actuator controller can receive a voltage signal or current signal having a magnitude, pulse width, phase, and/or frequency that correlates to a desired output direction, magnitude and/or direction of movement. In other cases, the actuator controller can be configured to receive a digital value corresponding to the same.

In some cases, the actuator controller can be coupled to and/or may include a memory storing a lookup table that correlates particular movements of a movable elements to particular currents or voltages applied to particular coils of a particular, given, camera module—such as the imaging system 108. Many constructions are possible.

In some cases, the actuator controller can be configured to receive as input an output provided by an accelerometer or gyroscope. This output can be inverted, scaled, and converted to a movement instruction executed by the actuator controller to cause an associated actuator structure to move a movable element, such as an imaging sensor or lens element.

In further embodiments, an actuator controller as described herein may be communicably and/or operably coupled to one or more instances of software executing over a processor disposed within the housing 102 of the electronic device 100. For example, in some embodiments, a software application instance instantiated over a processor and/or memory of the electronic device 100 can leverage the display 104 to generate a user interface with which a user of the electronic device 100 can interact. In some examples, the software application may be an imaging application, such as a camera control application.

The camera control application can present one or more user interface elements via the display 104 which may be selected by a user. In some cases, one of the user interface elements can be used by a user of the electronic device 100 to control a relative position of a movable element, such as to control a focal point, a focal length, an alignment between the image sensor and a central axis defined by a lens group, and so on.

In other words, in some cases, the user interface may receive a signal or other input from a user including an instruction to cause an actuator controller to select and/or apply an appropriate signal as input to an actuator structure, and in particular, to a coil of an actuator structure to cause the coil to generate a magnetic field of particular orientation and magnitude, thereby inducing a movement.

However, as noted above, movement over time of the movable elements of the imaging system 108 can result in accumulation of electrostatic charge. These charges can be associated with undesirable forces of attraction between a charged surface and other surfaces within the camera module 110. For example, as noted above, an electrostatically charged surface may oppose movement induced by the actuator controller. In other cases, electrostatically charged surfaces may add to movement induced by the actuator controller. In either case, movement of a movable element (e.g., image sensor, lens element, and so on) may not be to an expected location—it may move too little or too much, resulting in an undesirable behavior of the camera module 110 and imaging system 108.

As with many embodiments described herein, the camera module 110 can include a high voltage system that is conductively coupled to a discharge electrode. The discharge electrode can be driven to a voltage suitable for corona discharge, thereby ionizing air within the camera module 110. This ionized air can disperse within an internal volume of the camera module 110 so as to neutralize accumulated charges. This operation can restore nominal operation of the actuator controller and, additionally, can serve to dislodge dust particles adhered to charged surfaces that may introduce low contrast blemishes.

In some cases, an ionization operation (e.g., operation of the high voltage circuit and the discharge electrode) can be triggered in response to a user instruction received via the graphical user interface 106. In other cases, image analysis operations performed by the electronic device 100 to images captured by the imaging system 108 can be configured to detect low contrast blemishes. In response to detecting a low contrast blemish (indicating presence of dust on or near the image sensor), an ionization operation can be performed.

In some cases, once an ionization operation is performed, a user of the electronic device 100 may be instructed (e.g., via the graphical user interface 106) to agitate or shake the electronic device 100 so as to dislodge dust particles that are no longer electrostatically adhered to a surface of the imaging system 108. In other cases, an ultrasonic agitation of the image sensor may be triggered.

These foregoing example embodiments are not exhaustive; a person of skill the art may readily appreciate that a number of different triggers or signals may be generated and/or received in respect of a high voltage system and discharge electrode as described herein.

These foregoing embodiments depicted in FIGS. 1A-1B and the various alternatives thereof and variations thereto are presented, generally, for purposes of explanation, and to facilitate an understanding of various configurations and constructions of a portable electronic device that can incorporate a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
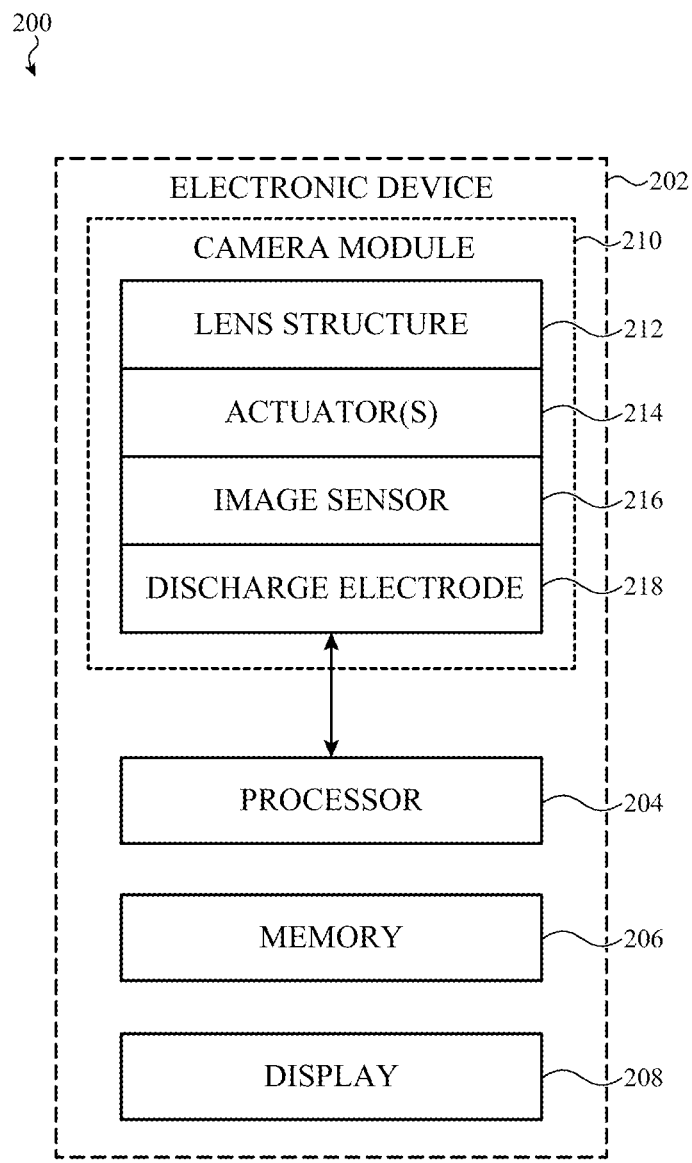
FIG. 2 is a simplified system diagram of an electronic device as described herein.

For example, more generally and broadly, it may be appreciated that any suitable electronic device can include a camera module as described herein. FIG. 2 is a simplified system diagram of such an example electronic device that can include a camera module with at least one actuator, as described herein.

For example, an electronic device that can include a camera system and/or camera module as described herein can be implemented as an example electronic device, identified in FIG. 2 as the electronic device 200.

The electronic device 200 can include a housing 202 that encloses and supports a processor 204, a memory 206, and (optionally) a display 208. As noted with respect to other embodiments described herein, the processor 204 can be configured to access the memory 206 to retrieve one or more computer-executable instructions and/or other executable assets in order to instantiate one or more instances of software that, in turn, may perform or coordinate one or more operations performed by the processor 204.

The instance of software can operate with or without user input. In some cases, the instance of software can be configured to operate as firmware of an application specific integrated circuit disposed within and/or shipped within a camera module such a described herein. In other cases, the software instance can be instantiated over a processor or coprocessor of an electronic device, such as the electronic device 200

For example, in some embodiments, the electronic device 200 can leverage the processor 204 and the memory 206 to instantiate an instance of a photography software application. The photography software application instance can be configured to access and/or communicably couple to a camera module 210 of the electronic device 200.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data processing device or circuit physically and/or structurally configured to define a temporary or durable (e.g., volatile or nonvolatile) storage media configured to store one or more data structures or files and so on, regardless of media type (e.g., optical, magnetic, electric, photonic, and so on).

The camera module 210, which can be disposed within its own module housing (not identified in the figure) can include a lens structure 212, an actuator structure 214, and an image sensor 216. The lens structure 212 can be configured to receive and focus light from a scene external to the electronic device 200 that may be imaged by the image sensor 216.

The lens structure 212 can include any suitable number of optical elements configured to modify a phase or direction of light passing therethrough. The lens structure 212 can include one or more movable or fixed concave or convex lenses; the configuration and/or position of the lenses of the lens structure 212 can vary from embodiment to embodiment and may be controlled at least in part by the actuator structure 214. The lens structure 212 can define an imaging axis that may align with a normal vector normal to a planar surface of the image sensor 216, the imaging surface. In other cases, the imaging axis may reflect from one or more reflective surfaces such as in a periscopic lens configuration.

In some cases, the lens structure 212 can also include one or more filters configured to exhibit selected reflectance and/or transmittance for particular bands of light. For example, the lens structure 212 can include an infrared cut filter configured to reflect infrared light away from the image sensor 216. In other cases, an infrared cut filter may be configured to absorb infrared light. In yet other cases, the lens structure 212 can include one or more color filters configured to reflect particular colors of light. In yet other cases, the lens structure 212 can include one or more reflective surfaces, such as mirrors or beam splitters configured to redirect a path of light as it passes through the lens structure 212. For example, in some constructions the camera module 210 can be implemented with a periscopic lens structure.

These forgoing examples are not exhaustive of the types or arrangements of optical elements that can be leveraged by a camera module, such as described herein. In particular, it may be appreciated by a person of skill in the art that the lens structure 212 can include any number of suitable optical elements, arranged in any suitable order, for any particular embodiment. Further, as noted above, in some cases, the actuator structure 214 can be configured to move the image sensor 216 itself.

As noted above, the actuator structure 214 can be configured to move the image sensor 216 and/or one more elements of the lens structure 212. In some embodiments, the actuator structure 214 can include multiple actuators each configured to move or reposition different portions of the camera module 210. Any one of these movements may result in the shifting of insulating materials or surfaces relative to other insulating or conductive surfaces which, in turn, can result in the accumulation of charge. In addition, ordinary motion of a camera module and/or an electronic device incorporating it can result in charge accumulation. The accumulation of charge, as noted above, can result in suboptimal or unexpected lens positioning and/or retention of dust particles on surfaces intersecting the imaging axis. These dust particles can cause low contrast blemishes in captured images.

To neutralize this charge, the camera module 210 can further include a discharge electrode 218 configured to receive a high voltage signal from a high voltage circuit (within or external to the camera module 210). In response to receiving the high voltage signal the discharge electrode 218 can ionize surrounding air, which in turn can be attracted to charged surfaces. These charged particles can interact with the charged surfaces, and mutually neutralize. In this manner, the discharge electrode 218 can be used to effectively neutralize charged surfaces (of any polarity) by ionizing air within the housing of the camera module 210.

These foregoing embodiments depicted in FIGS. 1A-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
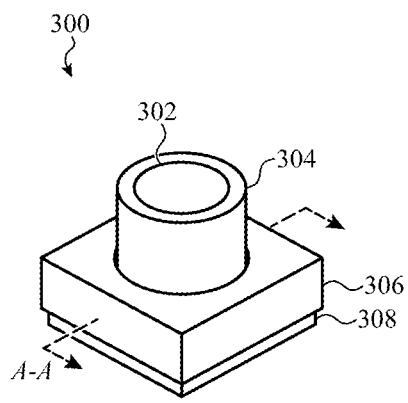
FIGS. 3A-3C depict a perspective view of an example camera module with a moveable image sensor and a high voltage discharge electrode.
Figure 3B:
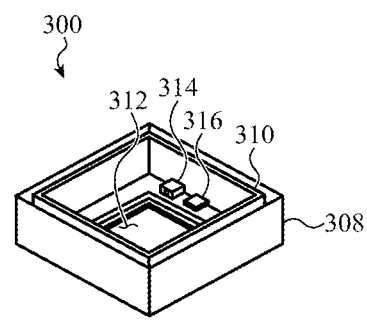
Figure 3C:
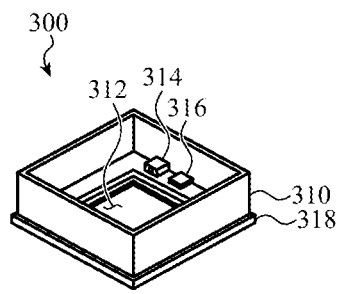

A camera module as described herein can be implemented in a number of suitable ways, and may take a number of suitable form factors. In many examples, as noted above, a camera module can take a small form factor suitable for inclusion within a housing of a low-profile electronic device such as a cellular phone. FIGS. 3A-3C depicts such a configuration, although it may be appreciate that this is merely one example construction.

The camera module 300 can include one or more lens elements or groups that cooperate to define a focal plane aligned with an active imaging area of an image sensor. As with other embodiments described herein, one or more elements of the camera module 300 can be movable.

To facilitate movement of one or more elements of the camera module (e.g., lenses, image sensor, and so on), flexible circuit boards may be used to accommodate and support functional electronics associated with the camera module 300.

In general, the flex circuit may include a plurality of planar segments that are connected via one or more bends. The flex circuit may be fixed relative to the image sensor, and may be positioned within the camera such that movement of the image sensor (or other movable elements) along a first direction causes twisting in one or more of the plurality of segments.

This twisting may allow the flex circuit to accommodate the movement of the image sensor along the first direction while itself having a negligible impact on the overall volume of the camera module 300, and specifically, overall volume of a module enclosure of the camera module 300. In certain constructions, the twisting or other deflection of the flex circuit can provide a return force to return the image sensor and/or other movable element to a nominal position.

FIGS. 3A-3C show a perspective view of a camera module 300 supported at least in part by a flex circuit. With reference to each of FIGS. 3A-3C, the camera module 300 may include the flex circuit, an image sensor, lens, an actuator assembly, a module enclosure, a discharge electrode, a high voltage generator, and other components.

In particular the camera module 300 includes a lens group 302 enclosed within a barrel 304 positioned within an apertured defined by a baffle 306, which may also be referred to as an upper housing part or an upper enclosure part. The baffle 306 can be coupled to a lower housing part 308, also referred to as a shield can. The baffle 306 and the lower housing part 308 cooperate to define a module housing for the camera module 300. The baffle 306 and the lower housing part 308 can be formed from metal, but this is not required of all embodiments. These parts may be welded, friction fit, riveted, or otherwise adhered (e.g., conductive epoxy, such as silver epoxy) to one another during assembly of the camera module 300.

More generally, the module enclosure may be configured to at least partially enclose the various components of the camera module 300, and in some variations may act to shield internal camera components from interference as well as to shield other components or devices external to the housing from electromagnetic interference originating within the camera module 300.

The lens group 302 includes one or more lens elements configured to direct light received by the camera toward an image sensor of the camera module 300. In some instances, the camera module 300 may be configured to have a folded optics arrangement, where the camera module 300 further includes one or more mirrors or prisms to redirect the light captured by the camera. It should be appreciated that in a folded optics arrangement, the optical axis of the lens group 302 and camera module 300 may extend along multiple directions (e.g., a light folding element such as a prism or mirror may change the direction of the optical axis).

For simplicity, the "optical axis" of a camera module is a portion of an optical axis of a lens, as light exits the lens and propagates toward an image sensor. The optical axis of an image sensor is considered to be a vector normal to a plane of an active image area of the image sensor; the normal vector is typically parallel to the optical axis. In folded optics arrangements, the optical axis may reflect once or more before intersecting the imaging area of an image sensor.

The camera module 300 can include a carrier 310 configured to move in one or more directions. The carrier 310 can be mechanically coupled to an image sensor 312 such that repositioning of the carrier 310 respectively causes repositioning of the image sensor 312.

In the illustrated construction, the image sensor 312 may receive light through the lens group 302, and may generate one or more signals that may convey information about the light received during imaging (which are conveyed off the image sensor 312 via a flex circuit). The image sensor may be any suitable sensor, such as a CCD, CMOS sensor, or the like. In some cases, the lens group 302, or a portion thereof, may be configured to move within the camera, by operation of an actuator assembly configured to move the carrier 310.

As mentioned above, the image sensor 312 (and/or portions of the lens group 302) may be configured to move within the camera (e.g., relative to at least the module enclosure). For example, the image sensor 312 may be moved relative to the lens group 302 along the optical axis of the camera module 300 to adjust the camera's focus, which may allow the camera module 300 to provide autofocus. Additionally or alternatively, the image sensor 312 may be moved relative to the lens in one or more directions perpendicular to or otherwise not aligned with the optical axis of the camera module 300, which may allow the camera module 300 to provide optical image stabilization capabilities.

It should be appreciated that the cameras described may be configured to perform both autofocus and optical image stabilization, or it may be configured to perform only one of these operations. Furthermore, in some instances, the camera module 300 may be further configured to adjust the position or optical power of the lens group 302 to assist with autofocus and/or optical image stabilization operations. This may be achieved by moving one or more lens elements of the lens group 302 relative to the image sensor 312. Additionally or alternatively, the lens group 302 may comprise a variable focus lens element (e.g., a liquid lens), which may be actuated to adjust the optical power and/or optical axis of the lens element.

Autofocus and optical image stabilization operations may be performed by any suitable combination of positional adjustments of the image sensor 312 and/or the lens group 302. With reference to FIG. 1B, the camera module 300 may further comprise an actuator assembly configured to move the image sensor within the camera module 300.

The actuator assembly includes an actuator and is coupled to the carrier 310, which may be more generally referred to as a suspension arrangement. The actuator can be configured to generate forces needed to move the image sensor, and may comprise a voice coil motor, a comb drive, or the like. In other cases, other mechanical couplings may be used for an actuator assembly such as described herein; suspension is not required of all embodiments. In some cases, as one example, bearings may be used.

In embodiments where the actuator includes a voice coil motor, the voice coil motor may comprise a magnet and a coil, one of which may be fixed relative to the image sensor 312 (either via a direct connection to the image sensor, or via indirect connection via one or more intervening components or support structures) and the other of which may be fixed within the camera in a manner that allows the image sensor 312 to move relative thereto.

The coil may be positioned within the magnetic field of the magnet such that when current is driven through the coil, a Lorentz force induces a change in relative position of the coil and magnet, which in turn may displace, tilt, translate, or rotate the image sensor within the camera module 300.

It should be appreciated that some embodiments may include an actuator with a plurality of voice coil motors, each of which may be used to generate Lorentz forces as discussed above. The suspension arrangement may be configured to suspend the image sensor 312 (as well as one or more other components connected thereto) within the camera module 300, and may allow the image sensor 312 to move within camera module 300 along one or more directions, angles, and/or within one or more planes or axes of rotation.

The suspension arrangement may comprise one or more suspension elements, such as flexures (e.g., leaf springs, suspension wires, flexure arms, and so on) and/or one or more bearings, and so on. In instances where the suspension arrangement includes one or more flexures, the flexures may provide a moveable connection between the image sensor (for example, via a holding structure that carries the image sensor) and one or more additional structures in the camera.

In instances in which the suspension arrangement includes one or more bearings, the bearings may be positioned between the moving the image sensor 312 (e.g., via a holding structure that carries the image sensor) and one or more additional structures in the camera, and may guide image sensor movement.

The camera module can likewise include a discharge electrode 314 and a voltage multiplier circuit 316. The discharge electrode 314 is conductively coupled to a high voltage output of the voltage multiplier circuit 316 and may be shaped with a pointed geometry, optionally surrounded by an arc prevention shroud. Each of the discharge electrode 314, the voltage multiplier circuit 316, and the image sensor 312 can be disposed upon or may be coupled to a substrate 318 that, in turn, moves with the carrier 310.

These foregoing embodiments depicted in FIGS. 3A-3C and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
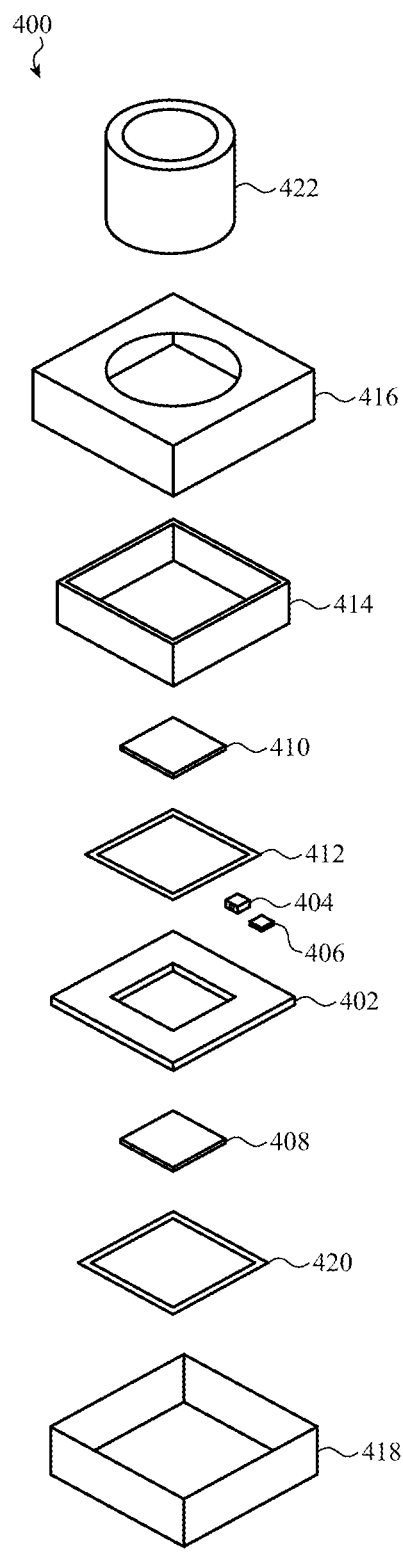
FIG. 4 depicts a simplified exploded view of the camera module of FIGS. 3A-3C, as described herein.

FIG. 4 depicts a detailed exploded view of the camera module shown in FIGS. 3A-3C. It may be appreciated that the camera module 400 of FIG. 4 is not presented to scale and is merely one example construction.

In this embodiment, the camera module 400 includes a substrate 402 onto which a discharge electrode 404 and its associated drive circuitry can be disposed. In particular, the discharge electrode 404 can be conductively coupled via a suitable insulated trace to a voltage multiplier circuit 406, each of which may be mechanically and conductively coupled to the substrate 402.

The camera module 400 includes an image sensor 408 configured to be positioned relative to a central portion of the substrate 402. An infrared cut filter 410 can be positioned over the image sensor 408, and may be a reflective IR cut filter, an absorptive IR cut filter, or a layered combination thereof. The infrared cut filter 410 can be manufactured from an insulating material and may be positioned over a central region of the substrate 402 so as to cooperate with the substrate 402 in insulating the image sensor 408 from any possible arcing with the discharge electrode 404. As a result of this construction, ionized gasses resulting from operation of the discharge electrode 404 can discharge the infrared cut filter 410 without risking the image sensor 408 being damaged by exposure to high voltage.

Once a discharge operation has completed, dust particles previously adhered/attracted to portions of the camera module 400 may dislodge. Such particles may be captured by an exposed adhesive trap 412, disposed around a perimeter of the infrared cut filter 410. In this manner, particles that migrate into the module housing of the camera module 400 can be permanently trapped on a surface of the exposed adhesive trap 412.

In other embodiments, the exposed adhesive trap 412 may be optional. For example, the infrared cut filter 410 can be adhered to the substrate 402 with a gasket of adhesive material with a z-height specifically selected so as to expose an area of adhesive sufficient to capture particles.

The camera module 400 also includes a first carrier 414 configured to operate with an actuator system to move the substrate (and in turn the image sensor 408) in X, Y, or Z directions. The assembly as described above can be protected by a baffle 416 configured to interface with a correspondingly-shaped lower housing part, identified as the shield 418. The first carrier 414 can be associated with a second carrier 420 disposed on and/or coupled to a lower portion of the substrate 402.

The assembly further includes a lens barrel 422 configured to occupy a fixed or movable position within an apertured defined by the baffle 416.

These foregoing embodiments depicted in FIG. 4 (and more broadly, FIGS. 3A-4) and the various alternatives thereof and variations thereto are presented, generally, for purposes of explanation, and to facilitate an understanding of various configurations and constructions of a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5A:
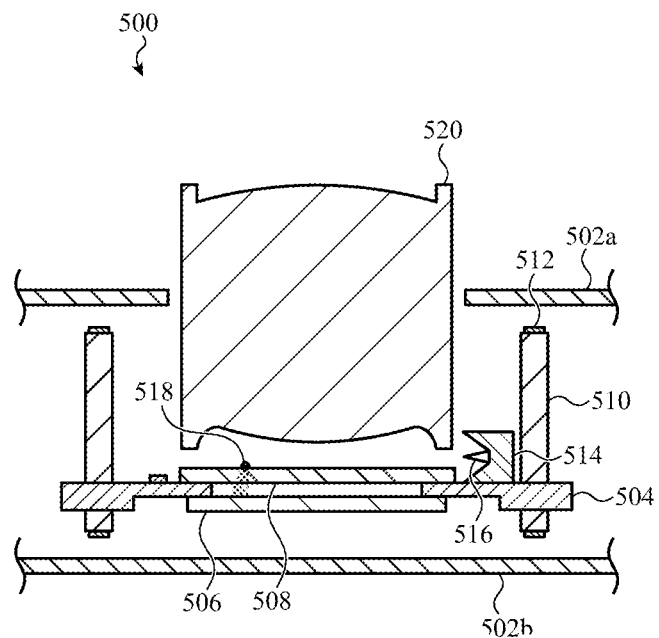
FIG. 5A depicts a cross-section view taken through line A-A of FIG. 3A, depicting an effect of accumulated electrostatic charge within a camera module.

For example, FIG. 5A depicts the camera module of FIG. 3A taken through line A-A. In this example, the camera module 500 includes an upper housing part 502a and a lower housing part 502b, which may be referred to as a baffle and a shield can respectively in some embodiments and implementations.

The housing parts cooperate to define a module enclosure that encloses and supports components of the camera module 500. The camera module 500 includes a substrate 504. The substrate 504 demarcates an internal volume of the module enclosure into an upper part and a lower part. The lower volume part encloses an image sensor 506 and the upper volume part encloses an infrared cut filter 508, such as described above.

In this construction, the two volumes are effectively electrically insulated from one another, but are not sealed from one another; air can circulate around and through the module housing around the perimeter of the substrate 504.

The substrate 504 also supports a carrier 510 that, as in other embodiments, is configured to move the substrate and its respective mechanically coupled parts, such as the image sensor 506. The carrier 510 can include an end stop 512 formed from a flexible insulating material. The end stop 512 can be configured to interface an interior surface of the upper housing part 502a to define a range of motion of the carrier 510.

As with other embodiments described herein, the camera module 500 further includes a discharge electrode disposed within a shroud or housing. In this example, the shroud 514 is depicted as a rectilinear shape, but it is appreciated this is merely one example; in other cases, a conical guide shape can be used. The shroud 514 defines a volume to enclose a pointed electrode 516 formed form a conductive material. The shroud 514 may be formed from an insulating material.

As noted above, movement of the carrier 510 can result in buildup of charge over time. The charge can accumulate on the surface(s) of any insulating material and/or on any electrically floating conductive material. As one example, the infrared cut filter 508 can accumulate charge which, in turn, can attract and retain a dust particle 518. The dust particle 518 may cast a shadow during imaging operations, which in turn can result in a low contrast blemish in resulting digital images. In other cases, the carrier 510 can experience additive or interfering forces as a result of electrostatic attraction. For example charge accumulated on the end stop 512 can cause the carrier 510 to be attracted to the upper housing part 502a, which may draw the camera module 500 out of focus.

Figure 5B:
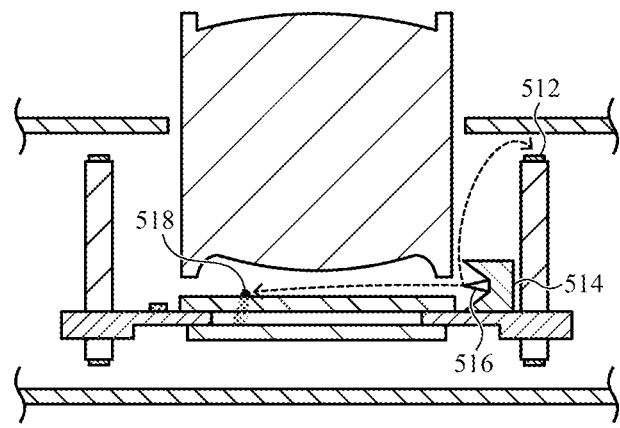
FIG. 5B depicts a cross-section view taken through line A-A of FIG. 3A, depicting ionizing operation of a discharge electrode as described herein.
Figure 5C:
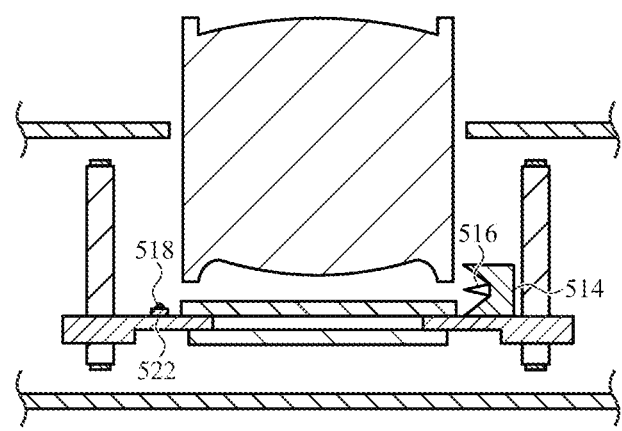
FIG. 5C depicts a cross-section view taken through line A-A of FIG. 3A, depicting a neutral charge dust particle captured by an adhesive trap.

To combat these negative effects, the pointed electrode 516 can be conductively coupled to a high voltage source, so as to raise the relative voltage at a tip of the pointed electrode 516 to or above a corona discharge voltage of the surrounding air. As shown in FIG. 5B, resulting ions in the air can be attracted to oppositely charged surfaces, such as a surface of the infrared cut filter 508 or a surface of the end stop 512. As shown, in FIG. 5C, once these charges are neutralized by the ions produced as a result of operation of the pointed electrode 516, the dust particle 518 may no longer be attracted to the infrared cut filter and may dislodge, eventually landing on and adhering to an exposed adhesive trap 522 as shown in FIG. 5C.

These foregoing embodiments depicted in FIG. 5 and the various alternatives thereof and variations thereto are presented, generally, for purposes of explanation, and to facilitate an understanding of various configurations and constructions of a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that a discharge operation (i.e., application of high voltage to a pointed electrode or discharge electrode) can be performed at any suitable time in response to any suitable signal. In some cases, a low contrast blemish can be detected by image analysis or factory testing. In other cases, unexpected motion or mechanical bias of a carrier can be detected.

Once a discharge operation is complete, the image sensor may be agitated so as to dislodge any previously adhered dust particles. For example, in some cases, a high frequency signal can be applied to an actuator structure so as to agitate the image sensor at high frequency. In other case, a low frequency high amplitude signal can be applied so as to induce movement of air within the camera module housing. In yet other cases, an instruction or notification can be provide to a user to shake or strike the electronic device. Many configurations and constructions are possible.

Figure 6:
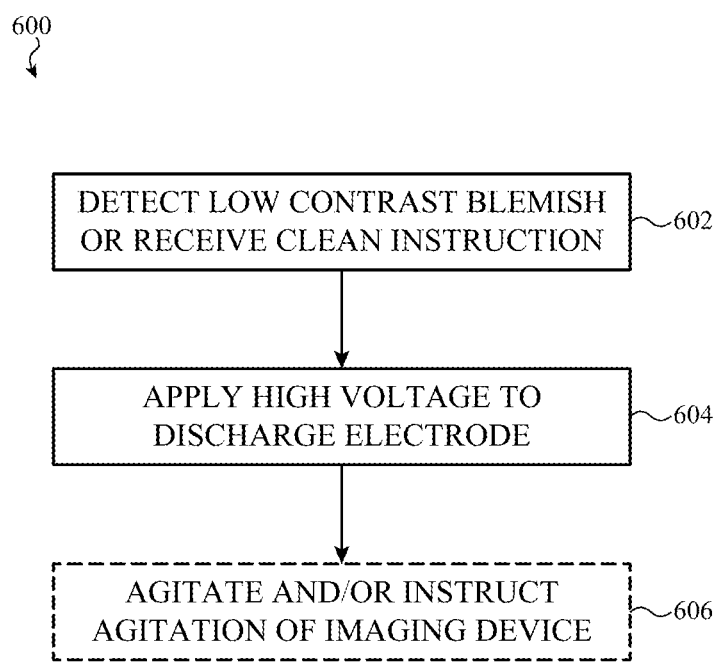
FIG. 6 is a flowchart depicting example operations of a method of detecting an effect of accumulated electrostatic charge within a camera module, as described herein.

FIG. 6 is a flowchart depicting example operations of a method of triggering a discharge operation. The method can be performed in whole or in part by any suitable hardware or software or cooperation therebetween.

The method 600 includes operation 602 at which a low contrast blemish is detected within an image produced by an image sensor of a camera module as described herein. In some embodiments, the image may be a test image captured during manufacturing. In other case, the image may be a user-captured image of an arbitrary scene.

A person of skill in the art may readily appreciate there are many suitable methods for detecting focal or contrast abnormalities in an image, many of which may be used with embodiments described herein.

The method 600 also includes operation 604 at which a high voltage signal can be applied to a discharge electrode as described herein. The high voltage signal can be produced by any suitable high voltage circuit, including multiplier circuits, voltage doublers, charge pumps, flyback coils, and back EMF circuit. Any suitable circuit may be used. The signal applied to the discharge electrode may be a direct current signal, whereas in other embodiments the signal may include frequency content in some embodiments (e.g., DC applied at a selected duty cycle). In other cases, alternating polarity signals may be used.

The method 600 also optionally includes operation 606 at which an image sensor or other part of a camera module may be agitated so as to dislodge any previously attracted dust particles. In some cases, the operation 608 can cause to be signaled a request to manually agitate the camera module.

Figure 7:
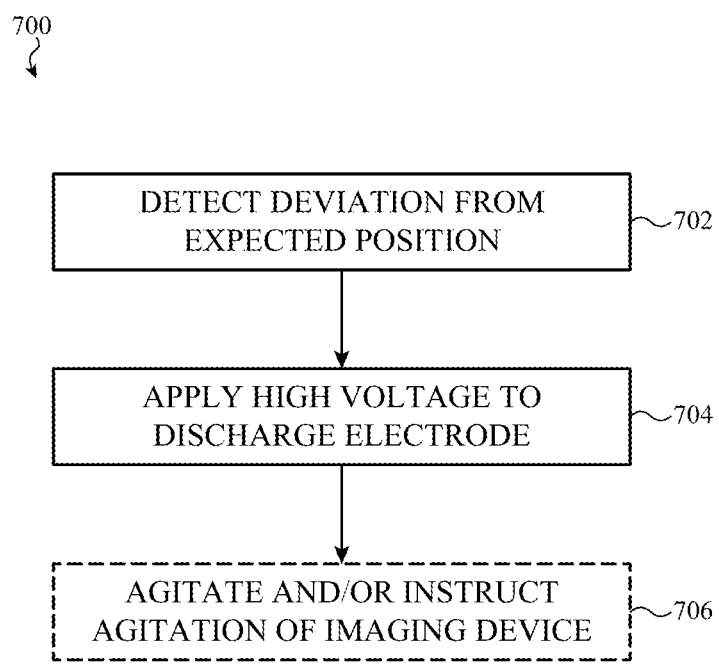
FIG. 7 is a flowchart depicting example operations of a method of detecting another effect of accumulated electrostatic charge within a camera module, as described herein.

FIG. 7 is a flowchart depicting example operations of a method of triggering a discharge operation. As with the method 600, the method 700 can be performed in whole or in part by any suitable hardware or software or cooperation therebetween.

The method 700 includes operation 702 at which an unexpected position of a carrier may be detected. For example, the camera module may exhibit difficulty focusing precisely without ringdown. In other cases, optical image stabilization movements may not precisely stabilize output imagery. In other cases, the camera module may fail a dynamic stability test operation (e.g., observing for mismatches between drive and motion of the camera module in test conditions, observing a pull-in of the carrier). A person of skill in the art may readily appreciate there are many suitable methods for detecting movement abnormalities in an image, many of which may be used with embodiments described herein.

The method 700 also includes operation 704 at which a high voltage signal can be applied to a discharge electrode as described herein. As with previous embodiments described herein, the high voltage signal can be produced by any suitable high voltage circuit, including multiplier circuits, voltage doublers, charge pumps, flyback coils, and back EMF circuit. Any suitable circuit may be used. The signal applied to the discharge electrode may be a DC signal, but in other cases may be AC or may include frequency content in some embodiments (e.g., DC applied at a selected duty cycle). In other cases, alternating polarity signals may be used.

The method 700 also optionally includes operation 706 at which an image sensor or other part of a camera module may be agitated so as to dislodge any previously attracted dust particles. In some cases, the operation 708 can cause to be signaled a request to manually agitate the camera module.

These foregoing embodiments depicted in FIG. 6-7 and the various alternatives thereof and variations thereto are presented, generally, for purposes of explanation, and to facilitate an understanding of various methods of operating a camera module, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some embodiments, a method as described herein can execute operations of FIG. 6 and FIG. 7 as alternative or supplemental detection operations. For example, in some cases, a first detection operation can be performed according to the method 600 and a second detection operation can be performed according to the method 700. In this example, two different detection operations can both signal a need or opportunity to initiate operation of a discharge electrode as described herein.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B. or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of some embodiments, whether or not such embodiments are described and whether or not such features are presented as being a part of a described embodiment. Thus, the breadth and scope of the present description should not be limited by any of the above-described exemplary embodiments but is instead defined by the claims herein presented.

What is claimed is:

1. A compact camera module comprising:
   a module housing enclosing an interior volume, the module housing defined by:
      an upper housing part; and
      a lower housing part;
   a substrate within the module housing and defining:
      an upper surface facing the upper housing part and defining, with the upper housing part, a first portion of the interior volume; and
      a lower surface facing the lower housing part defining with the lower housing part, a second portion of the interior volume;
   a carrier coupled to the substrate and configured to translate the substrate in a direction;
   an infrared cut filter disposed on the upper surface within the first portion of the interior volume;
   an image sensor disposed on the lower surface within the second portion of the interior volume; and
   a discharge electrode disposed on the upper surface and configured to ionize gases within the first portion of the interior volume to neutralize charge accumulation within the interior volume.

2. The compact camera module of claim 1, comprising an actuator configured to move the carrier in the direction.

3. The compact camera module of claim 1, wherein:
the substrate defines an aperture;
the infrared cut filter is disposed over the aperture on the upper surface of the substrate; and
the image sensor is disposed over the aperture on the lower surface of the substrate, the image sensor aligned with the infrared cut filter.

4. The compact camera module of claim 1, comprising an exposed adhesive disposed on upper surface of the substrate.

5. The compact camera module of claim 4, wherein the exposed adhesive is disposed around a perimeter of the infrared cut filter.

6. The compact camera module of claim 1, comprising a high voltage circuit conductively coupled to the discharge electrode.

7. The compact camera module of claim 6, wherein the high voltage circuit is configured to apply an alternating current signal to the discharge electrode.

8. The compact camera module of claim 1, wherein the discharge electrode comprises a pointed structure disposed within a shrouded enclosure.

9. The compact camera module of claim 1, wherein the interior volume is less than or equal to 1 cubic centimeter.

10. A camera module comprising:
a module housing enclosing an interior volume;
a substrate within the module housing and defining an aperture;
a carrier coupled to the substrate and configured to translate the substrate in a direction;
a high voltage electrode disposed the substrate and configured to ionize gases within the interior volume so as to neutralize charge accumulated on a surface within the interior volume; and
an image sensor disposed on the substrate, aligned with the aperture, and separated from the high voltage electrode by the substrate thereby preventing arcing between the high voltage electrode and the image sensor.

11. The camera module of claim 10, comprising an optical element disposed on the substrate over the aperture and aligned with the image sensor.

12. The camera module of claim 11, wherein the optical element comprises an infrared cut filter.

13. The camera module of claim 10, wherein the high voltage electrode is disposed within an insulating shroud.

14. A method of signaling actuation of a discharge electrode disposed within a compact camera module opposite an insulating substrate from an image sensor of the discharge electrode, the method comprising:
performing at least one of:
a first detection operation comprising:
receiving an image captured by the image sensor; and
determining that the image comprises a low contrast blemish; or
a second detection operation comprising determining that the camera module failed a dynamic stability test;
in accordance with a determination that the image comprises the high contrast blemish or that the camera module failed the dynamic stability test, generating a signal to cause a high voltage circuit within the compact camera module to apply a high voltage signal to the discharge electrode so as to neutralize charge accumulated on a surface within the interior volume; and
generating a notification to request a user agitate the compact camera module after the high voltage circuit applies the high voltage signal to the discharge electrode.

15. The method of claim 14, wherein the high voltage signal is an alternating current signal.

16. The method of claim 14, further comprising causing agitation of the compact camera module after the high voltage circuit applies the high voltage signal to the discharge electrode.

17. The method of claim 14, wherein the first detection operation is performed by an electronic device incorporating the compact camera module.

* * * * *